US009736506B2

(12) United States Patent
Jana et al.

(10) Patent No.: US 9,736,506 B2
(45) Date of Patent: *Aug. 15, 2017

(54) METHOD AND APPARATUS FOR MANAGING COMMUNICATION SESSIONS (71) Applicant: AT&T INTELLECTUAL PROPERTY I, LP, Atlanta, GA (US)

(72) Inventors: Rittwik Jana, Parsippany, NJ (US); John F. Murray, Morris County, NJ (US); Christopher W. Rice, Morris, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/922,411

(22) Filed: Oct. 26, 2015

(65) Prior Publication Data

US 2016/0044348 A1 Feb. 11, 2016

Related U.S. Application Data (63) Continuation of application No. 13/737,121, filed on Jan. 9, 2013, now Pat. No. 9,204,177, which is a
(Continued)

(51) Int. Cl.
*H04L 12/66* (2006.01)
*H04N 21/2343* (2011.01)
(Continued)

(52) U.S. Cl.
CPC . *H04N 21/234309* (2013.01); *H04L 65/1006* (2013.01); *H04L 65/1016* (2013.01);
(Continued)

(58) Field of Classification Search
USPC .......... 370/331–338, 352–401; 709/224–229
See application file for complete search history.

(56) References Cited

U.S. PATENT DOCUMENTS 7,290,076 B2 10/2007 Valenci
7,515,698 B2 * 4/2009 Van Wyk .............. H04M 1/575
379/142.01
(Continued)

FOREIGN PATENT DOCUMENTS

WO 2007/123887 1/2007

OTHER PUBLICATIONS

ETSI Standards, , "Telecommunications and Internet Converged Services and Protocols for Advanced Networking (TISPAN)", IPTV Architecture; IPTV Functions supported by the IMS Subsystem; Draft ETSI TS 182027, Lis Sophia Antipolis Cedex, France, vol. TISPAN No. VO.0.2, Oct. 1, 2006, XP014035832 ISSN: 0000-0001 Chapter 5: D Overview of Functional Entities.
(Continued)

*Primary Examiner* — Man Phan
(74) *Attorney, Agent, or Firm* — Guntin & Gust, PLC; Robert Gingher (57) ABSTRACT A system that incorporates teachings of the present disclosure may include, for example, a server operably coupleable to an internet protocol multimedia subsystem network and an interactive television system, where the server receives a session transfer request from a first communication device, where the session transfer request includes identification information associated with a second communication device, and where the server transmits a message to the second communication device and transmits a media adjustment message to a media resource server of the internet protocol multimedia subsystem network. The media content is adjusted and transmitted to the second communication device responsive to the media adjustment message, where the adjusted media content is generated by the media resource server based on the identification information associated with the second communication device. Other embodiments are disclosed.

20 Claims, 9 Drawing Sheets

Related U.S. Application Data continuation of application No. 12/418,178, filed on Apr. 3, 2009, now Pat. No. 8,374,172.

(51) Int. Cl.
  *H04N 21/25* (2011.01)
  *H04L 29/06* (2006.01)
  *H04N 21/239* (2011.01)
  *H04N 21/258* (2011.01)
  *H04N 21/2668* (2011.01)
  *H04N 21/41* (2011.01)
  *H04N 21/437* (2011.01)

(52) U.S. Cl.
  CPC ...... *H04L 65/1083* (2013.01); *H04L 65/4084* (2013.01); *H04N 21/2393* (2013.01); *H04N 21/23439* (2013.01); *H04N 21/25* (2013.01); *H04N 21/25866* (2013.01); *H04N 21/2668* (2013.01); *H04N 21/4126* (2013.01); *H04N 21/437* (2013.01)

(56) References Cited

U.S. PATENT DOCUMENTS

| | | | | |
|---|---|---|---|---|
| 7,716,310 B2* | 5/2010 | Foti | ............ | H04L 65/1069 709/220 |
| 7,929,562 B2* | 4/2011 | Petrovykh | ............ | H04L 12/58 370/235 |
| 8,079,042 B2* | 12/2011 | Foti | ............ | H04N 21/252 725/12 |
| 8,161,171 B2* | 4/2012 | Maes | ............ | H04L 65/104 709/219 |
| 2007/0140299 A1* | 6/2007 | Hofmann | ............ | H04L 29/06 370/486 |
| 2007/0153769 A1 | 7/2007 | Comstock | | |
| 2007/0250884 A1 | 10/2007 | Qiu | | |
| 2008/0109853 A1 | 5/2008 | Einarsson | | |
| 2008/0123603 A1 | 5/2008 | Cai | | |
| 2008/0192736 A1 | 8/2008 | Jabri | | |
| 2008/0298307 A1 | 12/2008 | Ohman | | |
| 2009/0034534 A1 | 2/2009 | Faccin | | |
| 2009/0260033 A1* | 10/2009 | Zhu | ............ | H04N 7/17318 725/39 |
| 2010/0121963 A1* | 5/2010 | Peng | ............ | H04N 21/643 709/228 |
| 2010/0122281 A1 | 5/2010 | Wang | | |
| 2011/0010459 A1 | 1/2011 | Stokking | | |
| 2011/0023071 A1 | 1/2011 | Li et al. | | |
| 2011/0067081 A1* | 3/2011 | strom | ............ | H04L 12/1836 725/110 |
| 2011/0138413 A1 | 6/2011 | Hjelm | | |

OTHER PUBLICATIONS

Patent Cooperation Treaty, , "International Search Report and Written Opinion", ISAIUS, by Officer Axel Manthey in PCT Application No. PCT/US20101029884, Document of 13 pages dated Sep. 9, 2010.

* cited by examiner

METHOD AND APPARATUS FOR MANAGING COMMUNICATION SESSIONS

CROSS-REFERENCE TO RELATED APPLICATIONS

This application is a continuation of and claims priority to U.S. patent application Ser. No. 13/737,121 filed Jan. 9, 2013 (now U.S. Pat. No. 9,204,177), which is a continuation of and claims priority to U.S. patent application Ser. No. 12/418,178 filed Apr. 3, 2009 (now U.S. Pat. No. 8,374,172), the disclosures of all of which are incorporated herein by reference in their entirety.

FIELD OF THE DISCLOSURE

The present disclosure relates generally to communication and more specifically to a method and apparatus for managing communication sessions.

BACKGROUND OF THE DISCLOSURE

Media content can be presented in various formats using various types of devices, such as set top boxes, mobile devices, personal computers, and so forth. A user utilizing one of these communication devices for viewing media content may desire to switch to another communication device for viewing the media content. Incompatibility of the various formats and/or devices can complicate the desired switch between devices.

DETAILED DESCRIPTION

One embodiment of the present disclosure can entail a computer-readable storage medium of a Serving Call Session Control Function (S-CSCF) operably coupled to an Internet Protocol Multimedia Subsystem network, where the storage medium comprises computer instructions to receive at the S-CSCF an INVITE message associated with a call to a first communication device from a second communication device, transmit from the S-CSCF the INVITE message to an application server and to the first communication device where the application server is operably connected with an Interactive Television (ITV) system, receive at the S-CSCF a determination of satisfaction of an identification threshold performed by the application server based on the INVITE message, and transmit from the S-CSCF a NOTIFY message to a set top box operably connected with the ITV system when the second communication device satisfies the identification threshold, where the NOTIFY message includes identification information associated with the second communication device.

Another embodiment of the present disclosure can entail a server operably coupleable to an Internet Protocol Multimedia Subsystem (IMS) network and an Internet Protocol Television (ITV) system, where the server includes a controller to receive a session transfer request from a first communication device operably connected to the ITV system and presenting media content where the session transfer request includes identification information associated with a second communication device operably connected to the ITV system, determine whether the session transfer request satisfies a transfer threshold, transmit an INVITE message to the second communication device when the session transfer request satisfies the transfer threshold, and transmit a media adjustment message to a media server for adjusting the media content and transmitting the adjusted media content to the second communication device, where the adjusted media content is generated based on the identification information associated with the second communication device.

Yet another embodiment of the present disclosure can entail a server operably coupleable to an Internet Protocol Multimedia Subsystem (IMS) network and an Interactive Television (ITV) system, where the server includes a controller to receive a session transfer request from a first communication device operably connected to the ITV system and presenting media content where the session transfer request includes identification information associated with a second communication device operably connected to the ITV system, and transmit an INVITE message to the second communication device and transmit a media adjustment message to a Media Resource Function Processor (MRFP) of the IMS network, where the media content is adjusted and transmitted to the second communication device based on receipt of the media adjustment message, and where the adjusted media content is generated by the MRFP based on the identification information associated with the second communication device.

Yet another embodiment of the present disclosure can entail a server operably coupleable to an Internet Protocol Multimedia Subsystem (IMS) network and an Interactive Television (ITV) system, where the server includes a controller to receive a session transfer request from a first communication device operably connected to the ITV system and presenting media content where the session transfer request includes identification information associated with a second communication device operably connected to the ITV system, transmit the session transfer request to an application server, receive an INVITE message from the application server when the session transfer request satisfies a transfer threshold, and transmit the INVITE message to the second communication device, where the media content is adjusted by a Media Resource Function Processor (MRFP) of the IMS network and transmitted to the second communication device by the MRFP based on receipt of a media adjustment message from the application server, and where the adjusted media content is generated by the MRFP based on the identification information associated with the second communication device.

Yet another embodiment of the present disclosure can entail a method including receiving a session transfer request from a first communication device operably connected to an Interactive Television (ITV) system and presenting media content where the session transfer request includes identification information associated with a second communication device operably connected to the ITV system, transmitting an INVITE message to the second communication device, and transmitting a media adjustment message to a Media Resource Function Processor (MRFP) of an Internet Protocol Multimedia Subsystem (IMS) network, where the media content is adjusted and transmitted to the second communication device based on receipt of the media adjustment message, and where the adjusted media content is generated by the MRFP based on the identification information associated with the second communication device.

Figure 1:
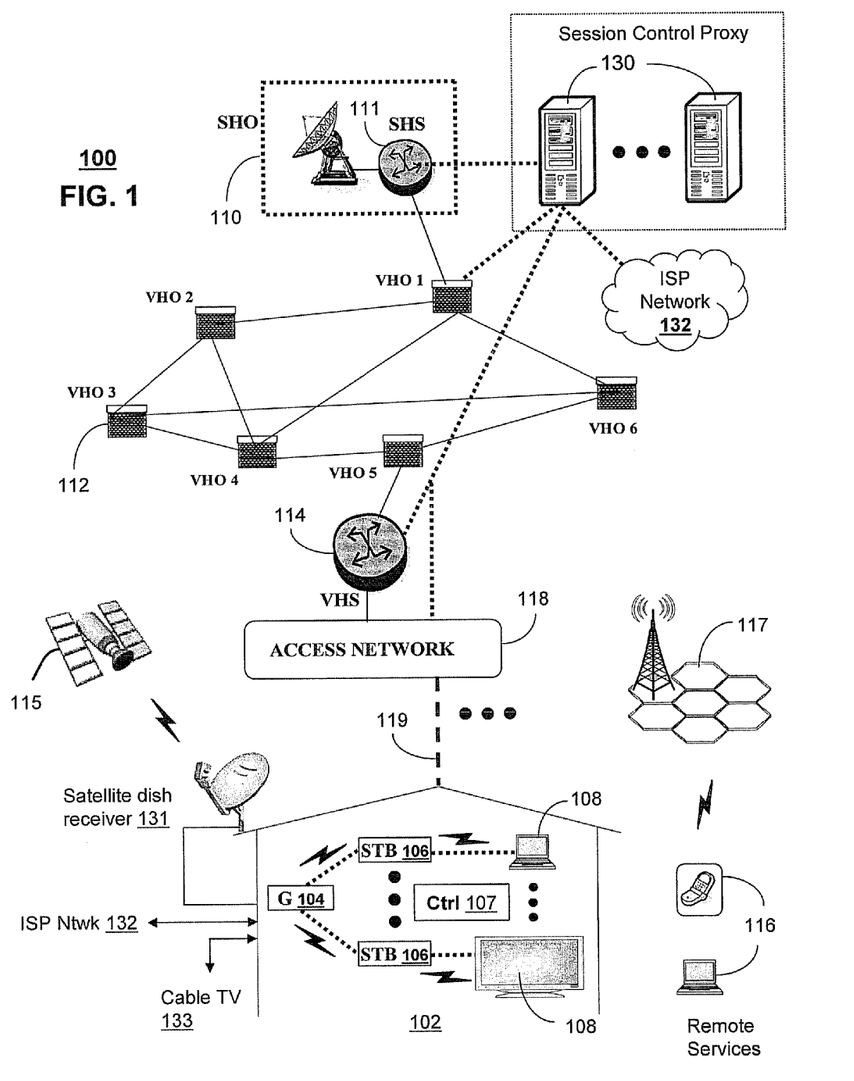
FIGS. 1-2 depict illustrative embodiments of communication systems that provide media services.

FIG. 1 depicts an illustrative embodiment of a first communication system 100 for delivering media content. The communication system 100 can represent an interactive television system such as an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol. The present disclosure contemplates the use of other interactive television systems, including cable.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

In one embodiment, computing devices 130 can comprise a session control proxy for transferring communication sessions or a portion thereof among different communication devices. System 100 includes an architecture for delivering personalized IPTV experiences to the end users. The framework can leverage the IMS system to enable multi-media services, including session flows for a single IPTV session switch between multiple set top boxes (STBs) and between a STB and a PC/mobile device SIP user agent, through use of proxy 130. Supplementary services, like caller ID and advanced telephony features, can also be migrated across multiple devices using the proxy 130.

Proxy 130 can provide the ability for a participant to transfer and retrieve an active media session to one device. Proxy 130 can also provide the ability for a session to be split across multiple devices (such as complete transfer or partial media specific transfer). Proxy 130 can provide the ability to also transfer supplementary services (such as CallerID) to the destination device along with the IPTV media. The exemplary embodiments can provide for locating destination devices in the vicinity of the current device. The techniques for device discovery can vary and can include protocols such as Bluetooth or SIP service location protocol.

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive over-the-air or landline media content services.

Figure 2:
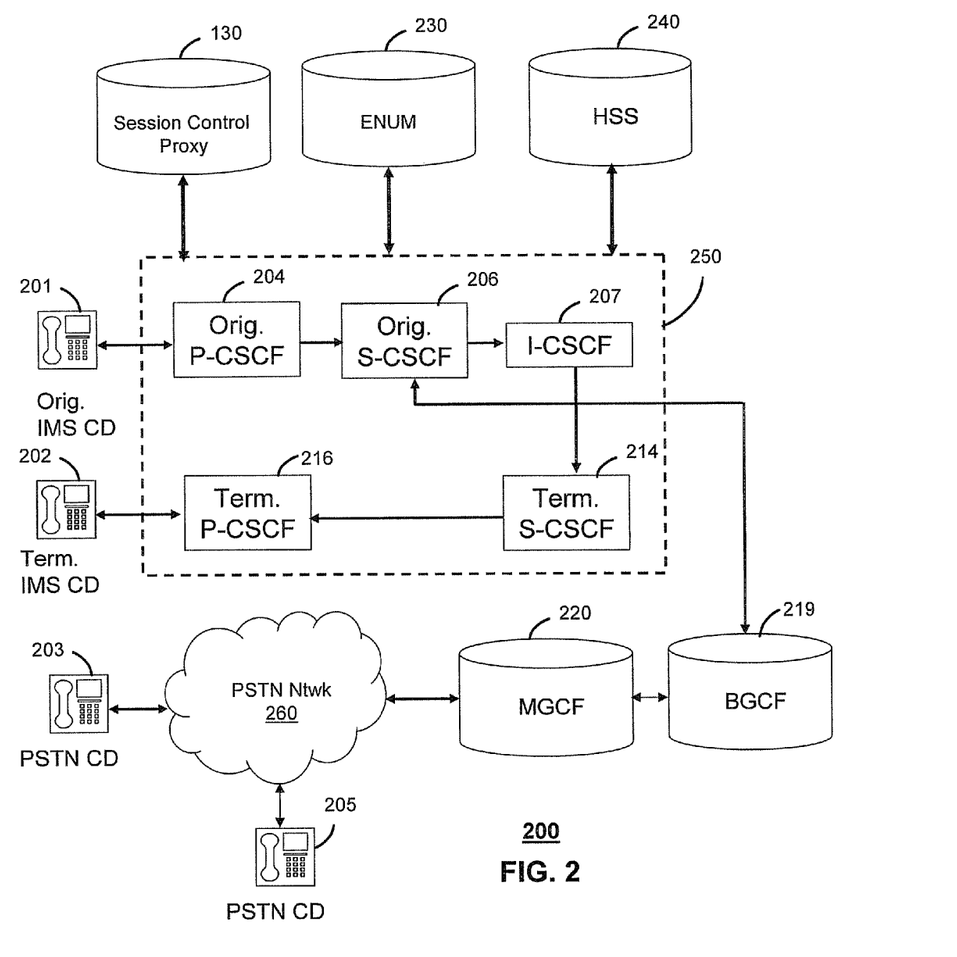

FIG. 2 depicts an illustrative embodiment of a communication system 200. employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260.

IMS CDs 201, 202 can register with the IMS network 250 by contacting a Proxy Call Session Control Function (P-CSCF) which communicates with a corresponding Serving CSCF (S-CSCF) to register the CDs with at the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit queries to the ENUM system 230 to translate an E.164 telephone number in the SIP INVITE to a SIP Uniform Resource Identifier (URI) if the terminating communication device is IMS compliant.

The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD by common means over the PSTN network 260.

The aforementioned communication process is symmetrical. Accordingly, the terms "originating" and "terminating" in FIG. 2 are interchangeable. It is further noted that communication system 200 can be adapted to support video conferencing by way of common protocols such as H.323. In addition, communication system 200 can be adapted to provide the IMS CDs 201, 203 the multimedia and Internet services of communication system 100.

The session control proxy 130 of FIG. 1 can be operably coupled to the second communication system 200 for purposes similar to those described above.

Figure 3:
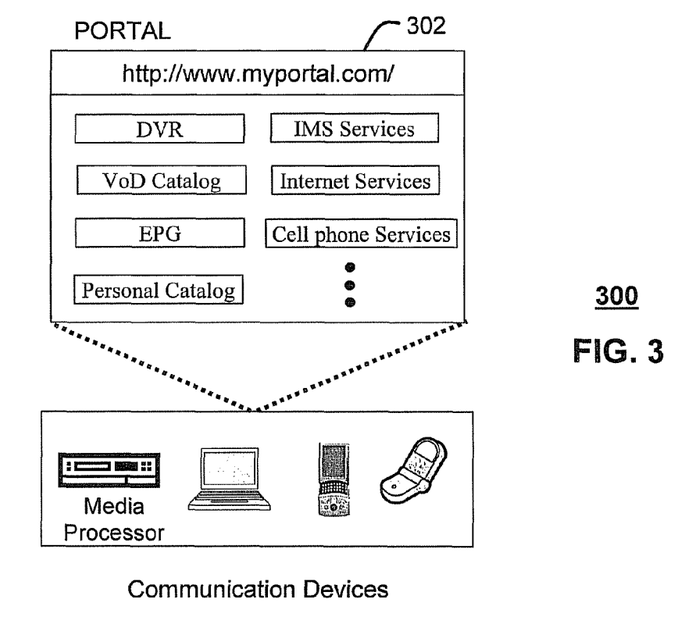
FIG. 3 depicts an illustrative embodiment of a portal interacting with the communication systems of FIGS. 1-2.

FIG. 3 depicts an illustrative embodiment of a portal 302 which can operate from the computing devices 130 described earlier of communication 100 illustrated in FIG. 1. The portal 302 can be used for managing services of communication systems 100-200. The portal 302 can be accessed by a Uniform Resource Locator (URL) with a common Internet browser such as Microsoft's Internet Explorer™ using an Internet-capable communication device such as those described for FIGS. 1-2. The portal 302 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 4:
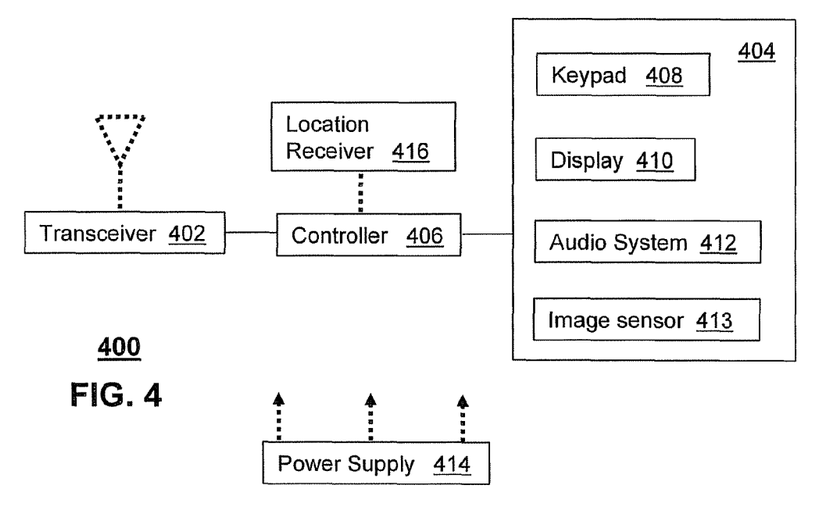
FIG. 4 depicts an illustrative embodiment of a communication device utilized in the communication systems of FIGS. 1-2.

FIG. 4 depicts an exemplary embodiment of a communication device 400. Communication device 400 can serve in whole or in part as an illustrative embodiment of the communication devices of FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, joystick, mouse, or navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver for identifying a location of the communication device 400 based on signals generated by a constellation of GPS satellites, thereby facilitating common location services such as navigation.

The communication device 400 can use the transceiver 402 to also determine a proximity to a cellular, WiFi or Bluetooth access point by common power sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Figures 5, 6:
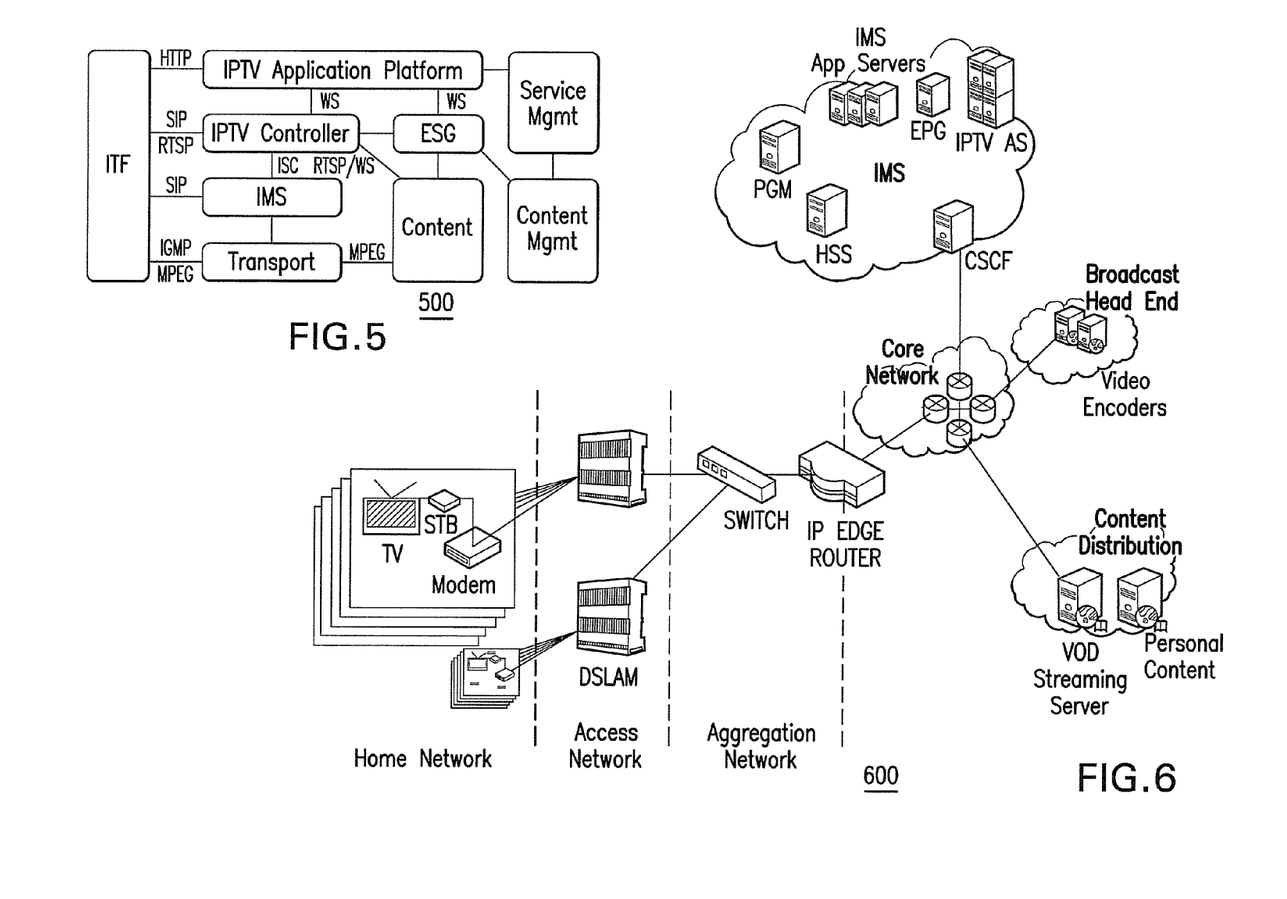
FIGS. 5-6 depict illustrative embodiments of communication systems that provide media services.

FIGS. 5-6 depict illustrative embodiments of communication systems 500 and 600 employing an IMS network architecture to facilitate the combined services of circuit-switched and packet-switched systems to support an IPTV system. Communication systems 500 and 600 can be overlaid or operably coupled with communication system 100 and/or 200 as another representative embodiment of the communication systems.

Systems 500 and 600 represent a layered model and a high-level IPTV network architecture being supported by an IMS infrastructure. Three functional layers can be defined which include the service layer, the control layer and the Media layer. The layered architecture can facilitate interoperability amongst different vendor solutions and can maintain ease of service creation. The IPTV service layer can provide multimedia services to the end user by means of an IPTV Application Platform (IAP). The IAP can implement a portal with which a user interacts, and can include functionalities like the electronic service guide (ESG), VoD, and so forth. The IAP can interact with the IPTV Terminal Function (ITF) that handles display and interactivity functions for users. In one exemplary embodiment, the IAP can perform functions such as content encoding/decoding and buffering, such as for either or both of unicast and multicast streams. System 500 can be divided into a number of logically separated parts including a home network, an access network, an aggregation network, and a service provider domain.

In one exemplary embodiment, the IMS IPTV architecture can utilize user personalization. To achieve personalization at the application level (for example personalized EPG's, advertisements, and/or personalized blended communication services), users or groups of users can have an IPTV profile. The relationship between the IPTV profile and the IMS profile can depend on a number of factors such as the availability of a Home IMS Gateway (HIGA). The HIGA can be a functional block with an attached ISIM card reader, which can be deployed in the residential gateway or any other networked consumer equipment. The HIGA can translate home signaling, such as SIP, UPnP, and/or HTTP, to IMS signaling. HIGA can also process NAT traversal and secure connectivity with the P-CSCF in the IMS domain, as well as identity, device subscription, and management inside the home domain and towards the IMS core.

For example, in a home network domain without an IMS gateway, IPTV accounts can require IMS public/private ID pairs for users of the system. These are used to log into the IMS domain. However, since the TV is a social device, the IMS IPTV STB can be provided with a default user which represents the household itself (for example, sip: family@op.com). In this way, the STB can be configured to use the default household user to log in to the IMS domain, personalizing itself with the default values for the whole family. In one embodiment, the STB can be configured to make the initial login of a personal user (i.e. sip: dad.family@op.com). In another embodiment, personal user profiles may be protected with a PIN that needs to be typed in via a remote control to select a particular profile.

In one embodiment, if the household contains a HIGA, the family members can choose whether they want to have full IMS identity, one which enables them full communication capabilities supported by IMS, or they can opt to just have an IPTV profile, that will use the default IMS household identity for authentication purposes. The IPTV profile information that needs to be shared between different IMS services can be stored in the IPTV XDMS database. For instance, this database can be accessed using XCAP, which works over HTTP. These profiles can be shared by different users and other stakeholders within the IPTV system.

In another exemplary embodiment, a Multicast Data Channel (MDC) can be provided which is an IP multicast pipe that allows the IPTV application server (or any other authorized node) to transmit information to all STBs registered with the IPTV service. For example, each STB can join the multicast group upon startup and can continue listening to it for as long as it is powered up. The MDC can be separated on different multicast groups for special purposes. In one embodiment, the MDC can carry information wrapped in an XML schema, which provides the ability to differentiate the various pieces of information, such as an electronic program guide information; a link to download the EPG from a server; the EPG in XML format; EPG updates; interactivity triggers (such as in the form of scheduled actions to be displayed/executed in the STB); an HTML page (such as a pop-up with information or triggering a special interactivity mode in the STB); firmware upgrades (such as the MDC carrying an order for all STB's to download an upgrade, immediately or schedule to some appropriate time); and/or alert or emergency messages which can be shown as immediate pop-ups in the STB (such as not disappearing until the user acknowledges them).

In one embodiment, for each piece of information in the MDC, there can be a tag with a timestamp, which marks the validity of the information. There can also be a tag that marks whether the information is included in the XML content (for example the EPG being inside of the XML-wrapped content), or whether it should be obtained via some other means (for example an HTTP GET to a particular server, or a file transfer of some type). The XML wrapper can contain a set of tags to identify the desired receivers of the content. In this way, the MDC can contain information that it has tagged to be received by a subset of the STB population.

In one embodiment, tags can include: the channel being watched (such as only STB's currently displaying that channel will react upon the information); age (such as only STB's whose active user falls into the age range will react); region (such as only STB's located in the specified region will react); gender (such as only STB's whose active user has the desired gender will react (if field is populated)). In one embodiment, the filtering of the received information according to the XML tags can be performed by STB. This can allow users to decide how much personal information they want to configure in their personal profiles in the STB.

Systems 500 and 600 can incorporate or otherwise utilize a control plane of the IPTV architecture that is divided into a set of functions, such as session setup, media flow setup, media flow control, and non-media related functions. The choice of protocols for each function can re-use existing standards or ETF standardized protocols. The IMS control layer can include x-CSCFs and an HSS. The S-CSCF can evaluate all originating and terminating messages and may, based on information of the service, link-in during session setup any number of IMS Application Servers (ASs) to perform desired IPTV services. For all IPTV related SIP messages originating from the ITF, the IPTV AS can be linked-in. For IPTV, the HSS can maintain triggers and filter information for the IPTV Public Service ID (PSI) or the service identifier. The information can be stored and conveyed on a per IMS Application Server basis. This means that IMS ASs can be allocated dynamically and that SIP messages can be routed all the time to the same IMS Application Server. The S-CSCF can download rules and triggers, upon user registration, from the HSS.

In one exemplary embodiment, systems 500 and 600 can monitor a number of performance metrics. For instance, transfer delay can be monitored and reduced to provide a smooth transition. The delay can be due to the time for media buffering or application setup. Media disruption can be monitored. Frame losses and packet drops during switching can have an undesired impact on the quality of the multimedia session. Destination device capabilities can be monitored. Display size, video resolution and codec mismatch can be reconciled prior to communication session transfer. Media adaptation or transcoding can be performed prior to or during handing off.

Systems 500 and 600 can provide access agnostic infrastructure where services are independent of the underlying access network; full mobility which can include transparent connectivity across heterogeneous networks, protocols and access mechanisms; always on, always available capabilities via sessions that cross networks and devices, automatically and transparently; user-centric context, both device and context sensitive; personalized context-aware applications catered to the needs of an individual or a group of individuals; flexible user interface enabling users to achieve their goals efficiently; and/or privacy, safety, and security of information to safeguard business and consumer integrity and protect the digital rights of content creators. The exemplary embodiments can provide an integrated solution for seamless, networked-based media over three screens (TV, mobile devices, and personal computers). The exemplary embodiments can enable portability of video services through IMS. For instance, several handoff scenarios between wireline set top boxes and wireless handsets can be achieved.

IMS provides for the core service network being independent of access technology; the same application and service being available from any access method or device; the ability to migrate and deploy across fixed and mobile users; the standards allowing scalable deployment of new services; evolution to combined services for enhanced user experience (presence, messaging, address book); built-in security such as identity management, authentication, authorization and service access; centralized user profiles shared between applications; architecture designed for scalability and redundancy; common solutions to achieve Quality of Service; and/or common Provisioning The exemplary embodiments can provide session mobility through use of a number of different components. For instance, a Correspondent Node (CN), a Mobile Node (MN), one or more local devices used as targets for session transfer, Directory Agent (DA), and/or a transcoder can be utilized. The CN can be a multimedia endpoint being used by a remote participant and may be located anywhere. The CN can be a SIP User Agent (UA), or a Public System Telephone Network (PSTN) phone reachable through a gateway. The MN can be a mobile device, containing a SIP UA for standard SIP call setup, as well as SIP-handling capabilities for session mobility and a User Agent (UA) for discovering local devices.

Figure 7:
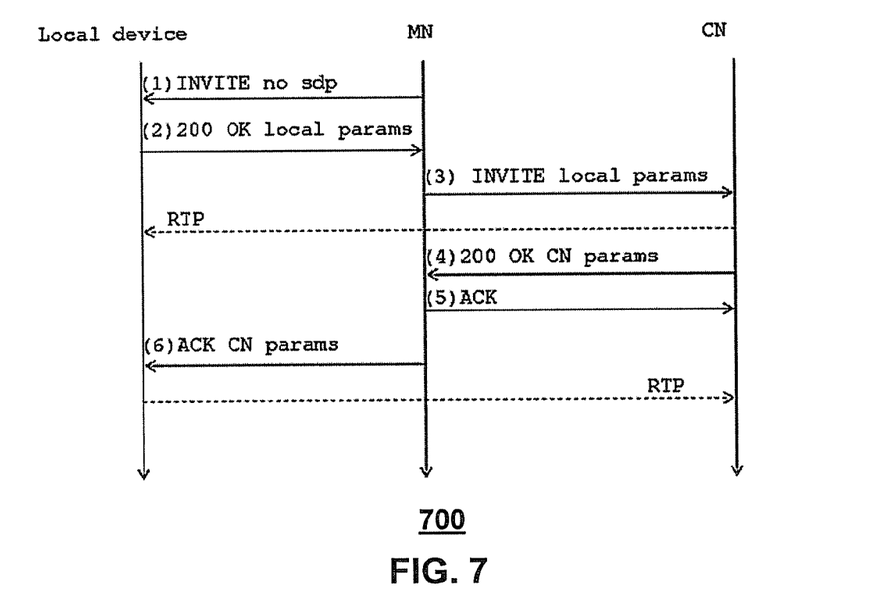
FIGS. 7-10 depict illustrative embodiments of session transfer flows operating in portions of the communication systems of FIGS. 1-2 and 5-6.

Referring to FIG. 7, a session transfer process 700 to a single device is shown utilizing mobile node control mode. In the mobile node control mode, the MN can use a third party call control. The MN can establish an SIP session with each device used in the transfer and can update its session with the CN, using the SDP parameters to establish media sessions between the CN and each device, which take the place of the current media session with the CN. The MN remains active to maintain the sessions.

Figure 8:
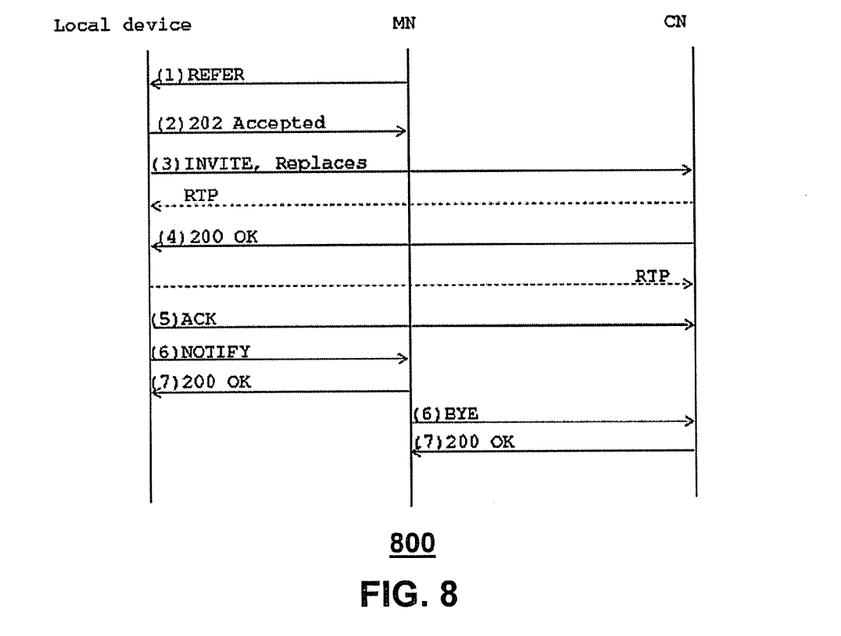

Referring to FIG. 8, a session transfer process 800 to a single device is shown utilizing session handoff mode. In session handoff mode, the session can be completely transferred, relinquishing control of both media and signaling to another device. Session handoff mode can use an SIP REFER method. This message can include a request sent by a "referer" to a "referee," which "refers" it to another URI, the "refer target," which may be a SIP URI to be contacted with an INVITE or other request, or a non-SIP URI, such as a web page. This URI can be specified in the "Refer-To" header. The "Referred-By" header can be used to give the referer's identity which is sent to the refer target for authorization. Various headers from this message may also be encrypted and sent in the message body as S/MIME to authenticate the REFER request.

Figure 9:
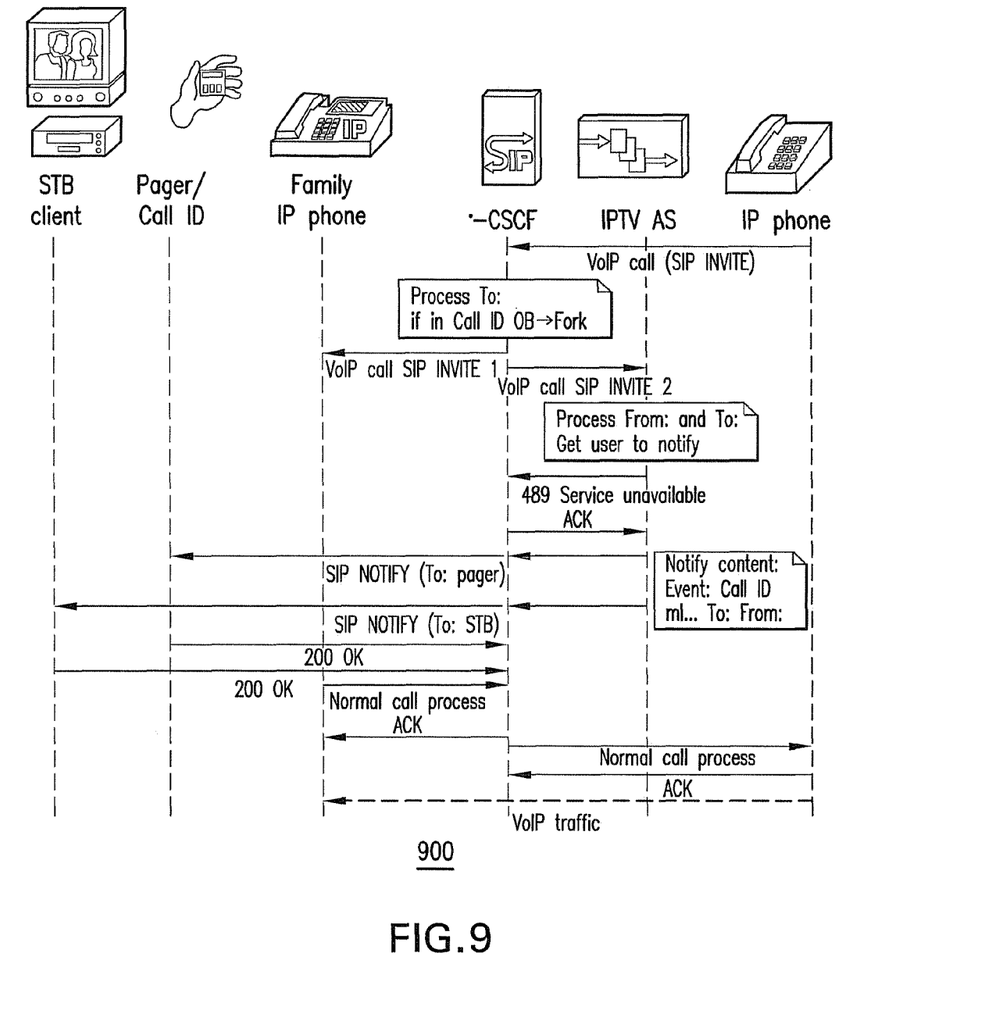

A process 900 for transferring an IMS IPTV session with all its associated embedded applications is shown in FIG. 9. Process 900 can include the IPTV AS being in control of the state information to be transferred to the new device. For example, one possible application could be callerID being displayed by an STB on a television screen. The callerID on screen embedded application can be personalized to the user logged in to the IMS IPTV service, so that only those users that have requested the application will see the callerID popup in the device (viewing station). The callerID process can include sending a SIP SUBSCRIBE for a callerID event to the IPTV AS, including a dedicated callerID AS. The SUBSCRIBE message can include the information associated with the caller, such as the URI, that the user wants to receive callerID information for. The AS can perform an identification threshold check, such as by determining the rights of the user to receive callerID information for the requested number, and can accept or reject the subscription.

In one exemplary embodiment, when a VoIP call is received for the family VoIP phone, the S-CSCF can forward the SIP INVITE towards the IPTV AS, which retrieves the To and From URI's and can answer with a 488 service unavailable. At the same time, the original INVITE can be forwarded to the recipient IP phone, which can proceed with the normal call handling. The AS can then check the active subscriptions to the called URI, and generate a SIP NOTIFY that contains the caller URI to each one of the active subscriptions. For instance, and as shown in FIG. 9, both a CallerID on screen in the STB and a pager device will receive the NOTIFY and show the desired information.

Figure 10:
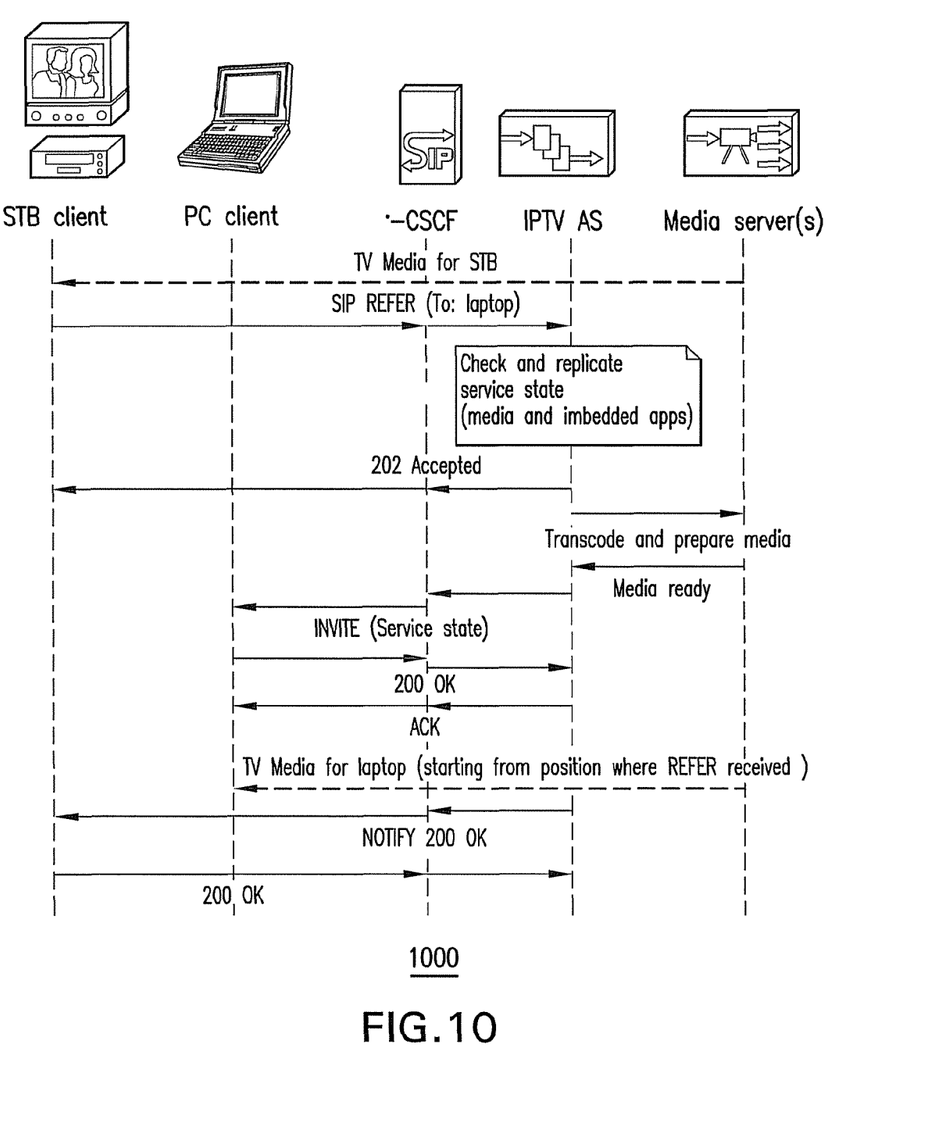

Referring to FIG. 10, once the CallerID application is running on a device as part of an IPTV session a session transfer process 1000 can provide for transferring the state of the called application. Process 1000 depicts a session transfer from a STB to a PC. For instance, this scenario could correspond to a family in which a member is watching a personalized TV session in the living room TV but when new members arrive, he or she decides to move the TV session to a PC in his or her room.

In one embodiment, when the user logged into the STB desires to transfer the personalized TV session to his or her other device, including a mobile device, a menu in the STB can be utilized that allows sending the session to a predefined PC client, a predefined mobile or a different sip: URI. For instance, the user can configure the sip URI's of his mobile device when building the configuration profile for the IMS IPTV service. When the user selects the 'Transfer to PC' menu item, a SIP REFER can be triggered towards the IPTV AS with a Refer-To header pointing to the sip URI of the PC client. The IPTV AS can receive the REFER message and can check for the required rights to transfer the session to the new device. If the rights are correct then the AS can answer with an Accepted message and can retrieve the state information of the user's IMS IPTV session. The state information can include the media characteristics as defined by the sdp negotiation in the associated INVITE to set up the media pipe, the channel being watched and position in the media (if watching VoD), which can be maintained by the AS and updated by the client when the channel zapping stabilizes, and the associated state for the session-embedded applications.

For instance, the application's state can be the callerID tel URI that the user has subscribed to. The IPTV AS can then send an SIP INVITE towards the new device (such as the receiving PC client), with an SDP that describes the media to be transferred as well as the other elements of the session state information, and in parallel can command the components of the media plane to prepare the media for the characteristics of the new device if needed. The interaction with the media plane can occur via the Mp interface towards the Multimedia Resource Function controller (MRFC). The MRFC can be a media control node which is able to locate the required asset in a media distribution or caching overlay, and control (using the Mp interface) the Media Resource Function Processor (MRFP) for transcoding the asset to the required or desired format for the new device. The receiving client can then complete the INVITE dialog and send a SUBSCRIBE message to the event associated with the tel URI received as part of the INVITE from the IPTV AS. When the INVITE dialog completes then the IPTV AS can instruct the required media nodes to transmit the media to the new device and send a SIP NOTIFY to the referrer node announcing that the transfer was completed successfully. Upon receiving the NOTIFY with the successful completion of the REFER, the referring client can choose to terminate the previous IMS IPTV session or keep it active. This determination can be made by the referrer when sending the SIP REFER, so that the session transfer becomes a session replication. Once the session has been transferred to the new device, any NOTIFY message triggered by an external VoIP call will be automatically sent to the new device and to the old device (if the referrer decides to replicate instead of transfer) or only to the new device if the referring session has been terminated.

EXAMPLE

Figure 11:
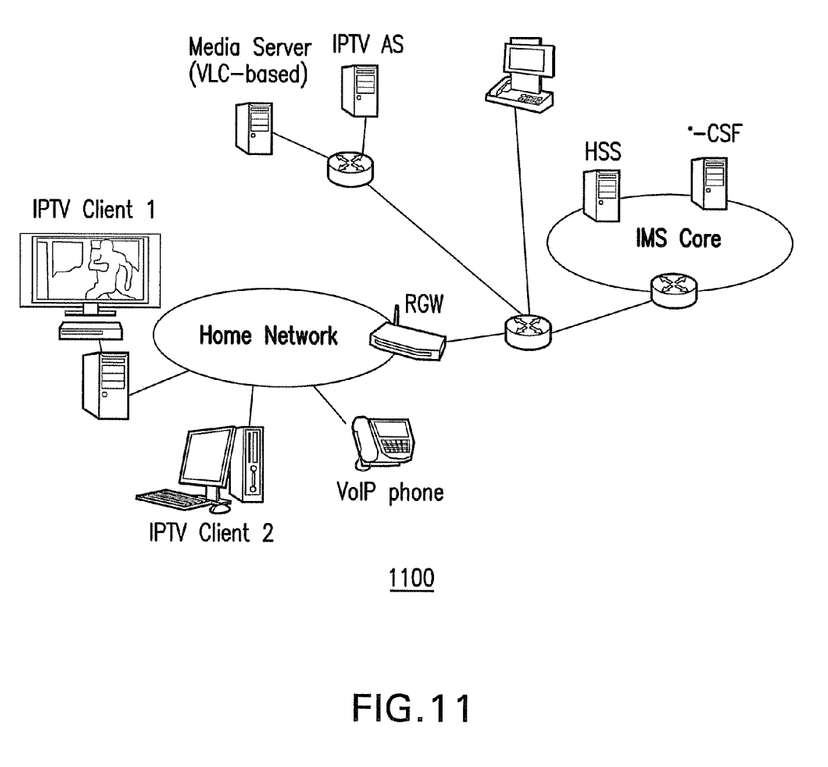
FIG. 11 depict an illustrative embodiment of a communication system that provide media services.

Referring to FIG. 11, a communication system 1100 is shown for implementing an IPTV session transfer using IMS functionality. The home domain can include two IMS IPTV clients running in two emulated STBs on Linux PC machines. For instance, the first client can be the STB in the family living room that is connected to a TV. The second client can be the personal PC of the user doing the session transfer. A VoIP phone is as well connected to the home domain and registered in the IMS operator as tel:+1234@operator.com. The home gateway can be connected to a router to which the different network nodes are attached. The IMS core can include a P-CSCF and a S-CSCF running on a Linux PC with an emulated HSS. The CSCFs are based on an OpenSER SIP router. The media plane can be provided by a set of VLC (Video LAN media server) instances running in a separate PC. Live TV (i.e., multicast MPEG2-TS flows) can be streamed from the media server; VLC commands can be sent via a telnet interface from the AS to control the VoD assets.

System 1100 was evaluated for a processing delay for the session transfer in the AS, which represents the time it takes from the moment the user presses the menu 'Transfer to my PC' until a message pops up in the PC screen asking to accept the session transfer. The time was on the order of 450 ms, which corresponds to the REFER, state check in the AS and INVITE being sent. System 1100 was evaluated for a media startup delay in the client which corresponds to the time it takes from the moment the receiving client accepts the session transfer until the media appears on the screen. This time includes the average waiting time for an I-frame in the client media player and the buffering the client. For live TV (i.e. MPEG2-TS multicast) the waiting time was approximately two seconds, which corresponds to a GOP size of approximately five seconds of MPEG-2 encoded media. For VoD, the time corresponds to the AS instructing the media server to start the streaming and locate the point where the VoD was when the REFER event was received and its value was under three seconds for the VoD assets that were being used (H.264 encoded RTP streams with a movie length of five minutes).

Upon reviewing the aforementioned embodiments, it would be evident to an artisan with ordinary skill in the art that said embodiments can be modified, reduced, or enhanced without departing from the scope and spirit of the claims described below. For example, transfer sessions can be performed between multiple different devices such as from an STB to a PC and a mobile device. Supplementary services, beyond the exemplary CallerID, can also be transferred to the new sessions, such as call forwarding, conference calling, and so forth. The exemplary embodiments allow for transferring sessions that are associated with various media content types and the type of media is not intended to be limiting. For instance, session transfers can be performed when a user desires to switch the on-going video conference from his or her mobile device to his or her STB.

Other suitable modifications can be applied to the present disclosure without departing from the scope of the claims below. Accordingly, the reader is directed to the claims section for a fuller understanding of the breadth and scope of the present disclosure.

Figure 12:
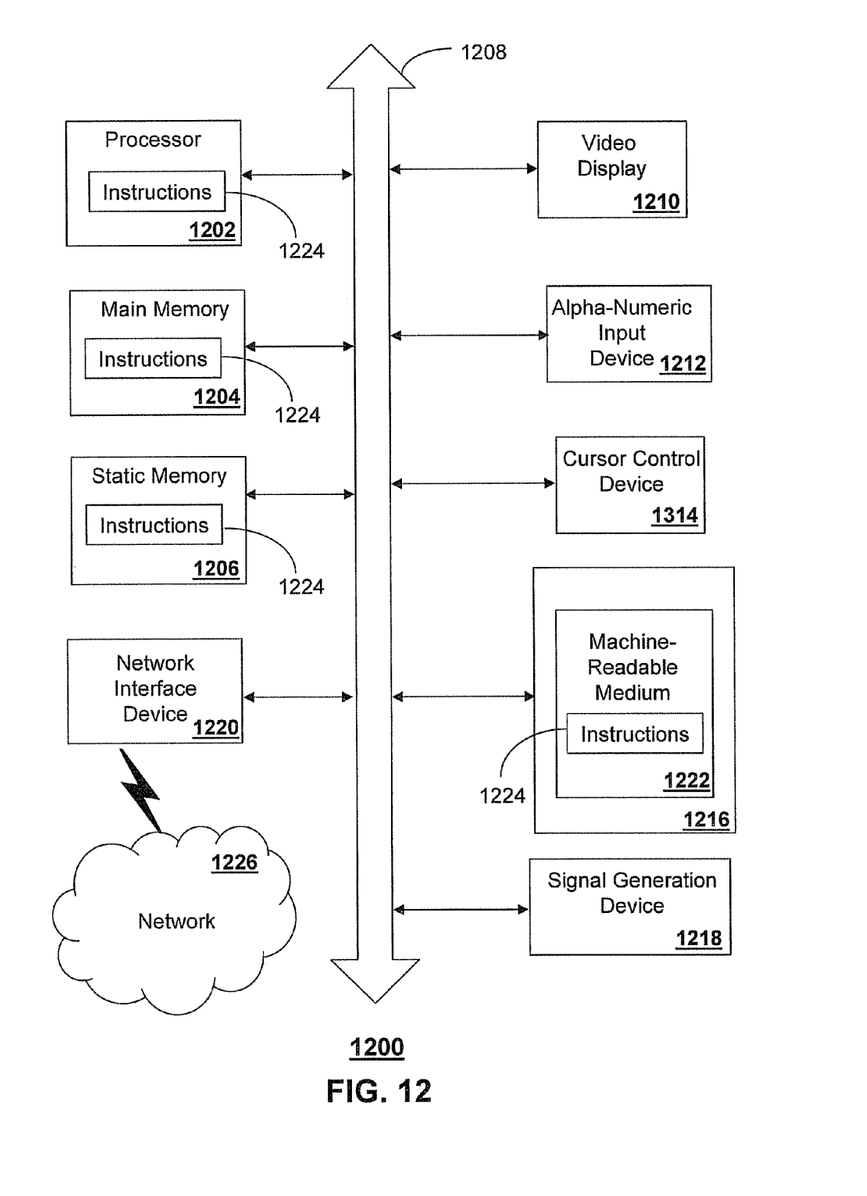
FIG. 12 is a diagrammatic representation of a machine in the form of a computer system within which a set of instructions, when executed, may cause the machine to perform any one or more of the methodologies discussed herein.

FIG. 12 depicts an exemplary diagrammatic representation of a machine in the form of a computer system 1200 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1200 may include a processor 1202 (e.g., a central processing unit (CPU), a graphics processing unit (GPU, or both), a main memory 1204 and a static memory 1206, which communicate with each other via a bus 1208. The computer system 1200 may further include a video display unit 1210 (e.g., a liquid crystal display (LCD), a flat panel, a solid state display, or a cathode ray tube (CRT)). The computer system 1200 may include an input device 1212 (e.g., a keyboard), a cursor control device 1214 (e.g., a mouse), a disk drive unit 1216, a signal generation device 1218 (e.g., a speaker or remote control) and a network interface device 1220.

The disk drive unit 1216 may include a machine-readable medium 1222 on which is stored one or more sets of instructions (e.g., software 1224) embodying any one or more of the methodologies or functions described herein, including those methods illustrated above. The instructions 1224 may also reside, completely or at least partially, within the main memory 1204, the static memory 1206, and/or within the processor 1202 during execution thereof by the computer system 1200. The main memory 1204 and the processor 1202 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1224, or that which receives and executes instructions 1224 from a propagated signal so that a device connected to a network environment 1226 can send or receive voice, video or data, and to communicate over the network 1226 using the instructions 1224. The instructions 1224 may further be transmitted or received over a network 1226 via the network interface device 1220.

While the machine-readable medium 1222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory machine-readable storage medium comprising executable instructions that, when executed by a processing system including a processor, facilitate performance of operations comprising:

receiving a session transfer request from a first communication device operably connected to an interactive television system and presenting media content, the session transfer request comprising identification information associated with a second communication device operably connected to the interactive television system;

determining whether the session transfer request satisfies a transfer threshold associated with the first communication device;

transmitting a communication request message to the second communication device and to an application server at a same time when the session transfer request satisfies the transfer threshold; and transmitting a media adjustment message for adjusting the media content and transmitting adjusted media content to the second communication device, the adjusted media content being generated based on the identification information associated with the second communication device, wherein the determining whether the session transfer request satisfies the transfer threshold is based on a user profile associated with the first communication device.

2. The non-transitory machine-readable storage medium of claim 1, wherein the media adjustment message is transmitted to a Media Resource Function Processor, and wherein the processing system operates in an Internet Protocol Multimedia Subsystem (IMS) network.

3. The non-transitory machine-readable storage medium of claim 1, wherein the first communication device comprises a set top box.

4. The non-transitory machine-readable storage medium of claim 3, wherein the second communication device comprises a mobile device.

5. The non-transitory machine-readable storage medium of claim 1, wherein the session transfer request comprises a header having Session Initiation Protocol Uniform Resource Identifier (SIP URI) data associated with the second communication device.

6. The non-transitory machine-readable storage medium of claim 1, wherein the adjusted media content is generated via transcoding.

7. The non-transitory machine-readable storage medium of claim 1, wherein the application server retrieves uniform resource identifier data associated with the second communication device.

8. A device comprising:
a processing system including a processor; and
a memory that stores executable instructions that, when executed by the processing system, facilitate performance of operations comprising:
receiving, from a first communication device, a communication request message associated with a communication session directed to a second communication device;
transmitting the communication request message to an application server and to the second communication device at a same time, wherein the application server is operably connected with an interactive television system;
receiving a determination of satisfaction of an identification threshold for the first communication device, wherein the determination is performed by the application server based on the communication request message; and
transmitting a notification message to a media processor operably connected with the interactive television system responsive to the determination of the satisfaction,
wherein the notification message includes identification information associated with the second communication device, wherein media content associated with the communication session is adjusted according to operational capabilities of the second communication device, and wherein the determination of the satisfaction of the identification threshold is based on a user profile.

9. The device of claim 8, wherein the adjusted media content is generated via transcoding.

10. The device of claim 8, wherein the user profile is associated with the first communication device.

11. The device of claim 8, wherein the media processor comprises a set top box that presents the identification information based on the notification message.

12. The device of claim 8, wherein the operations further comprise transmitting the notification message to a third communication device responsive to the determination of satisfaction.

13. The device of claim 12, wherein the third communication device comprises a pager.

14. The device of claim 8, wherein the processing system comprises a Serving Call Session Control Function (S-CSCF) server.

15. The device of claim 8, wherein the first and second communication devices are voice over internet phones, and wherein the application server controls state information to be transferred to the media processor.

16. The device of claim 8, wherein the application server retrieves uniform resource identifier data associated with the second communication device.

17. A method comprising:
receiving, by a processing system including a processor, a session transfer request from a first communication device operably connected to an interactive television system and presenting media content, the session transfer request comprising identification information associated with a second communication device operably connected to the interactive television system;
determining, by the processing system, whether the session transfer request satisfies a transfer threshold associated with the first communication device;
transmitting, by the processing system, a communication request message to the second communication device and to an application server at a same time when the session transfer request satisfies the transfer threshold; and
transmitting, by the processing system, a media adjustment message for adjusting the media content and transmitting adjusted media content to the second communication device,
wherein the adjusted media content is generated based on the identification information associated with the second communication device, wherein at least one of the first or second communication devices is a mobile communication device, and wherein the determining whether the session transfer request satisfies the transfer threshold is based on a user profile associated with the first communication device.

18. The method of claim 17, wherein one of the first or second communication devices is a set top box.

19. The method of claim 17, wherein the application server retrieves uniform resource identifier data associated with the second communication device.

20. The method of claim 17, wherein the adjusted media content is generated by a Media Resource Function Processor via transcoding.

* * * * *